(12) United States Patent
Kiss et al.

(10) Patent No.: US 9,083,758 B2
(45) Date of Patent: Jul. 14, 2015

(54) SYSTEM AND METHOD FOR USING PRESENCE INFORMATION

(75) Inventors: Krisztian Kiss, San Francisco, CA (US); Miraj Mostafa, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 210 days.

(21) Appl. No.: 12/136,714

(22) Filed: Jun. 10, 2008

(65) Prior Publication Data

US 2008/0313321 A1    Dec. 18, 2008

Related U.S. Application Data

(60) Provisional application No. 60/943,263, filed on Jun. 11, 2007.

(51) Int. Cl.
*H04L 29/06* (2006.01)
*H04L 29/08* (2006.01)

(52) U.S. Cl.
CPC ...................... *H04L 67/24* (2013.01)

(58) Field of Classification Search
CPC ..... H04L 67/24; H04L 67/22; H04L 12/2602; H04L 67/16
USPC ........................................................ 709/223
See application file for complete search history.

(56) References Cited

U.S. PATENT DOCUMENTS

| | | | | |
|---|---|---|---|---|
| 7,552,446 B1 * | 6/2009 | Sosnovsky et al. | ........... | 719/318 |
| 7,711,782 B2 * | 5/2010 | Kim et al. | ..................... | 709/206 |
| 2004/0153552 A1 * | 8/2004 | Trossen et al. | ................ | 709/229 |
| 2005/0262198 A1 | 11/2005 | Leppanen et al. | | |
| 2006/0013233 A1 * | 1/2006 | Trossen et al. | ................ | 370/401 |
| 2006/0143646 A1 * | 6/2006 | Wu et al. | .......................... | 725/10 |
| 2006/0248184 A1 * | 11/2006 | Wu et al. | ....................... | 709/224 |
| 2008/0208953 A1 | 8/2008 | Tian | | |

FOREIGN PATENT DOCUMENTS

| | | |
|---|---|---|
| EP | 1 292 081 A | 3/2003 |
| WO | WO 2007/048339 A | 5/2007 |
| WO | WO 2007/092668 A | 8/2007 |
| WO | WO 2008/120901 A | 10/2008 |

OTHER PUBLICATIONS

Day et al.; RFC 2778: A Model for Presence and Instant Messaging; Feb. 2000; retrieved from http://www.ietf.org/rfc/rfc2778.txt.*

(Continued)

*Primary Examiner* — Chau Le
(74) *Attorney, Agent, or Firm* — Ditthavong & Steiner, P.C.

(57) ABSTRACT

An improved system and method for communicating Presence Information. According to various embodiments, the sequence of actions undertaken in established Presence procedures are changed, and enhancements are also provided for Watcher information notifications. Upon the initiation of a Presence Service, the Presence Source starts publishing Presence Information about a Presentity using a soft-state approach. Instead of having publication occur first, the Presence Source makes a subscription for the Watcher information first or simply waits until the Presence Server contacts the Presence Source. As a result, publication occurs only when there is a demand therefor.

23 Claims, 4 Drawing Sheets

(56) References Cited

OTHER PUBLICATIONS

Khartabil et al., Functional Description of Even Notification Filtering, RFC 4660, Retrieved from http://tools.ietf.org/html/rfc4660, Sep. 2006.*
Niemi, Session Initiation Protocol (SIP) Event Notification Extension for Notification Throttling, Retrieved from http://tools.ietf.org/pdf/draft-niemi-sipping-event-throttle-05, Mar. 2007.*
Sparks, The Session Initiation Protocol (SIP) Refer Method, Retrieved from http://www.ietf.org/rfc/rfc3515.txt, Apr. 2003.*
Singh et al. "Presence Traffic Optimization Techniques" Oct. 28, 2006, pp. 1-16. Internet Citation, URL: https://mice.cs.columbia.edu/getTechre.
Reichl et al. "Practical Experiences With an IMS-Aware Location Service Enabler on Top of an Experimental Open Source IMS Core Implementation," Journal of Mobile Multimedia, vol. 2, No. 3, 2006, pp. 189-224.
International Search Report for PCT Application No. PCT/IB2008/052295.
Chinese Office Action to related Chinese Application No. 200880019953.5 dated Feb. 29, 2012, pp. 1-16.
International Preliminary Report on Patentability for PCT/IB2008/052295 dated Dec. 11, 2009, pp. 1-7.
Office Action for related European Patent Application No. 08763287.3 dated Sep. 23, 2010, pp. 1-4.
Office Action for related European Patent Application No. 08763287.3 dated Sep. 4, 2012, pp. 1-4.
Rejection Decision for corresponding Chinese Patent Application No. 200880019953.5 dated Jun. 5, 2013, 9 pages.
Office Action for related Chinese Patent Application No. 200880019953.5 dated Dec. 4, 2013, pp. 1-11.

* cited by examiner

SYSTEM AND METHOD FOR USING PRESENCE INFORMATION

CROSS-REFERENCE TO RELATED APPLICATIONS

The present application claims priority to U.S. Provisional Patent Application No. 60/943,263, filed Jun. 11, 2007, the contents of which are incorporated herein by reference in their entirety.

FIELD OF THE INVENTION

The present invention relates generally to Presence Services. More particularly, the present invention relates to the communication of Presence Information among a Presence Source, a Presence Server and a Watcher.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

A Presence Service is a network service which accepts, stores and distributes Presence information. Presence information typically comprises a status indicator that indicates the ability and willingness of a communication partner to communicate.

Presence Service can be linked with many other services or enablers. "Horizontal" Presence Services can be used as the launching pad for a different type of communication. Moreover, Horizontal Presence Services can be used to circulate personal and device-specific information to a selected set of authorized Watchers. (A Watcher or Presence Information Watcher is an entity that requests Presence information about a Presentity (an entity described by Presence information) from a Presence Service.) However, all of these services can collectively cause a great deal of Presence traffic.

Due to the nature of Presence Services, a simple change in one's Presence information can cause a significant amount of traffic in a network. Additionally, the integration of location information within a Presence Service can be quite demanding in terms of traffic. For example, it is helpful to consider a situation where an entity is uploads its location information whenever this information changes. In this situation, if the location of the entity is regularly changing, then a great deal of network traffic is generated.

Because of the traffic-related issues discussed above, there have been a number of efforts attempted to improve the traffic situation. In one such arrangement intended to improve Presence traffic, upon receiving any subscription request from a Watcher, the Presence Server makes a back-end subscription for the Presence Information to the associated Presence Source in the network (i.e. a Presence Network Agent (PNA)). Therefore, the PNA uploads Presence Information in terms of a notification to the Presence Server, which then makes the Presence Information available to the Watcher. In another system, upon receiving any subscription request from a Watcher, the Presence Server uses a Session Initiation Protocol (SIP) REFER request to inform the associated Presence Source about the need of Presence Information. In response, the Presence Source uploads Presence Information using a SIP PUBLISH request to the Presence Server, which then makes the Presence Information available to the Watcher.

However, the need to further reduce the amount of Presence-related traffic remains. In particular, the above systems cannot indicate what specific Presence Information is required, if any, and they also introduce new protocol procedures. Therefore, the Presence Source still needs to publish all available Presence Information about a Presence Entity (Presentity). Issues also remain regarding authentication and authorization (i.e. security), Presence Source discovery and routing.

Additionally, it is also noted that, according to the existing model of Presence, the publication of Presence information is carried out independent of subscription. For example, there is no point for a Presence Source to publish Presence Information, if there is no subscription (demand) for that information. If a Presence Source is publishing dynamic Presence information (e.g. location information), the demand for the information should be understood before the information is published. It is possible that Presence Information about a Presentity may be required only at a specific time (e.g., a moment of interest) and not on a frequent basis. It is also possible that only specific Presence information may be required, i.e., not all of Presence Information.

SUMMARY OF THE INVENTION

Various embodiments provide an improved system and method for communicating Presence Information. Various embodiments are implemented by changing the sequence of actions undertaken in established Presence procedures, and enhancements are also provided for Watcher information notifications. According to various embodiments, upon the initiation of a Presence Service, the Presence Source starts publishing Presence Information about a Presentity using a soft-state approach (i.e., using SIP PUBLISH requests). In the various embodiments, publication does not occur first. Instead, the Presence Source makes a subscription for the Watcher information first or simply waits until the Presence Server contacts the Presence Source. As a result, publication occurs only when there is a demand therefor. In the case of a demand, the attributes of that demand are also taken into account in order to determine what kind of information to publish and what the frequency of publication should be.

These and other advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF VARIOUS EMBODIMENTS

Figure 1:
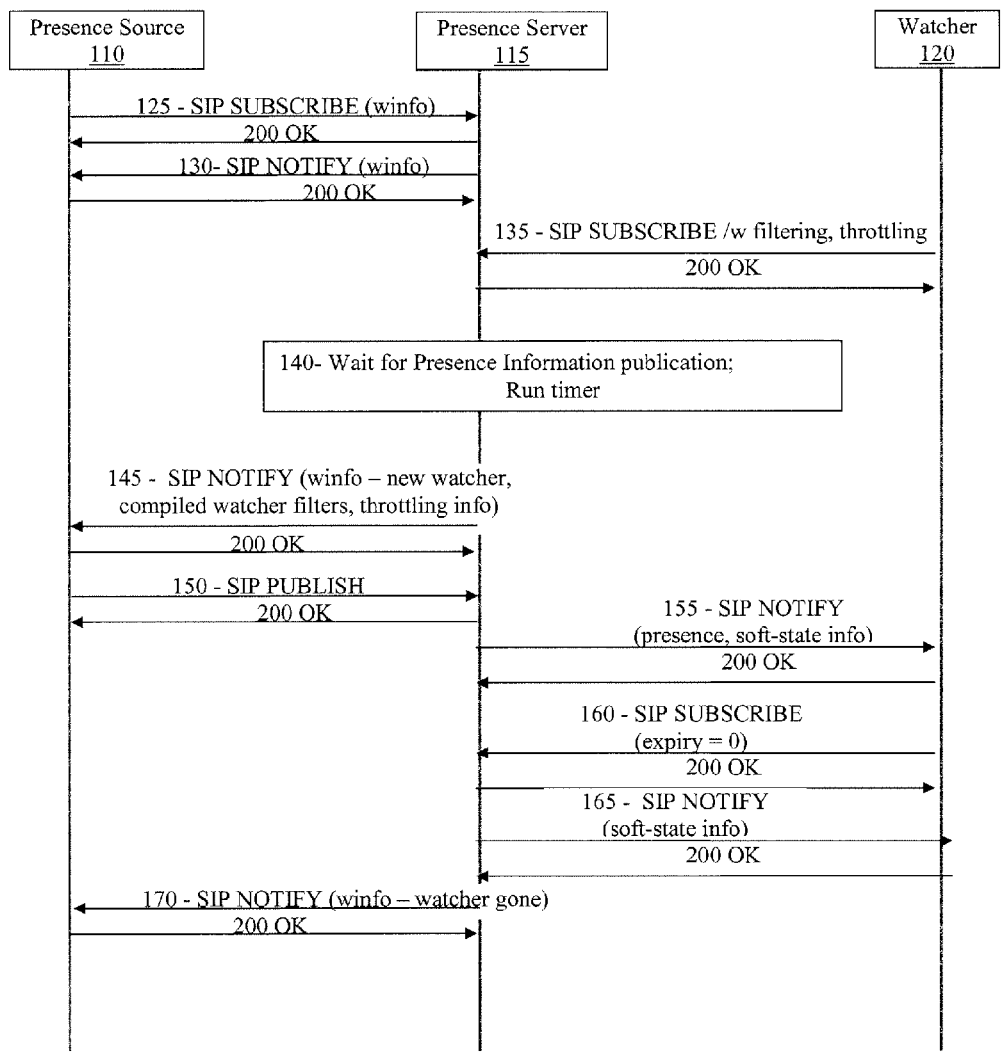
FIG. 1 is a flow chart showing the interaction among a Presence Source, a Presence Server, and a Watcher according to one embodiment of the present invention.

Various embodiments provide an improved system and method for communicating Presence Information. Various embodiments are implemented by changing the sequence of actions undertaken in established Presence procedures, and enhancements are also provided for Watcher information notifications. According to various embodiments, upon the initiation of a Presence Service, the Presence Source starts publishing Presence Information about a Presentity using a soft-state approach (i.e., using SIP PUBLISH requests).

In the various embodiments, publication does not occur first. Instead, the Presence Source makes a subscription for the Watcher information first or simply waits until the Presence Server contacts the Presence Source. As a result, publication occurs only when there is a demand therefor. In the case of a demand, the attributes of that demand are also taken into account in order to determine what kind of information to publish and what the frequency of publication should be. According to various embodiments, if a Presence Server receives a subscription request from an authorized Watcher for Presence Information of a Presentity, and the Presence Source is already subscribed to Watcher information changes, then the Presence Server will notify the Presence Source about the newly subscribed Watcher.

Because the Presence Server expects the Presence Source to publish Presence Information immediately after issuing a Watcher information notification, special care is taken for one-time Presence fetch operations. Since the Presence Server may delay the notification back to the Watcher because of a lack of input Presence Information, the Presence Server starts the running of a timer in which it expects the Presence Source to publish Presence Information. If everything goes as expected, upon receiving a Watcher information (winfo) notification, the Presence Source publishes Presence Information to the Presence Server, and the Presence Server forwards the Presence Information to the Watcher in a Presence event notification. If the Presence Source does not perform publication within the expected time frame (this is considered an error case), then the Presence Server notifies the Watcher via an empty Presence document, or the currently available Presence document (e.g. default, hard-state information) if available.

In addition to the above, to implement one-time Presence fetch operations, the Watcher information state machine previous defined in the Internet Engineering Task Force (IETF) Request for Comments (RFC) 3857 is modified. (IETF RFC 3857 can be found at the IETF website). According to RFC 3857, it is recommend that winfo notifications not be sent for transient state changes, e.g. for a Presence fetch operation when the state machine changes from the "init" state to the "active" state to the "terminated" state. In various embodiments, this behaviour is modified so that notifications are always generated when the state machine moves from the "init" state to the "active" state. This enables the Presence Source to learn about an active fetcher via the winfo notification and publish Presence Information.

If the Presence Source is not subscribed to Watcher information changes, then the Presence Server sends a SIP REFER request towards the Presence Source in order to trigger the Presence Source to subscribe. The SIP REFER method is specified in IETF RFC 3515, which can be found at the IETF website. An implicit subscription is not necessary as described in IETF RFC 3515. Therefore, the procedures described in IETF RFC 4488, which can be found at the IETF website, are also utilized to eliminate the unnecessary implicit subscription.

Various embodiments also serve to extend the scope of winfo notifications to include other specific attributes. These attributes may either be specified by the Watcher in its subscription request or by the Presence Server when sending notifications to the Watcher. These specific attributes include, but are not limited to, event notification filtering as defined in IETF RFC 4660 and IETF RFC 4661 (which can be found at the IETF website), Watcher requested throttling as defined in draft-niemi-sipping-event-throttle-05 (which can be found at the IETF website), or PS configured throttling. With this approach, the Presence Source only publishes Presence Information if needed. In this case, Presence Server only publishes the Watcher requested Presence Information.

FIG. 1 is a flow chart showing the interaction among a Presence Source 110, a Presence Server 115, and a Watcher 120 according to one embodiment of the present invention. At 125 in FIG. 1, the Presence Source 100 subscribes to Watcher information by sending a SIP SUBSCRIBE (winfo) notification to the Presence Server 115. (Each request that is transmitted according to the process in FIG. 1 is responded to with a 200 (OK) response, acknowledging the receipt thereof.) At 130, the Presence Server 115 indicates to the Presence Source 110, using a SIP NOTIFY (winfo) request, that there is no active Watcher.

At some later time, an authorized Watcher 120 subscribes for the Presence Information of the Presentity at 135 using a SIP SUBSCRIBE request. The subscription request contains a demand for specific Presence Information (event notification filtering) and also a throttle parameter. Lacking available Presence Information, the Presence Server 115 delays answering the Watcher's subscription request with a notification and starts a timer defining the time period in which the Presence Server 115 expects to receive Presence Information from the Presence Source 110. This is represented at 140.

At 145, the Presence Server 115 sends a winfo notification to the Presence Source using a SIP NOTIFY request. This notification indicates that there is now a Watcher 120 watching for Presence Information. The winfo notification also includes the filtering and throttling information previously received from the Watcher 120. At 150, the Presence Source 110 makes a soft-state publication using a SIP PUBLISH request, with the information being provided to the Presence Server 115. If there was a request from the Watcher 120 for specific Presence Information, then the source publishes only those attributes. If there was a request from the Watcher 120 to throttle the notifications, the source publishes the Presence Information only within the particular throttle interval. At 155, the soft-state Presence Information is then provided from the Presence Server 115 to the Watcher 120 using a SIP NOTIFY request.

At some later time, the Watcher 120 may decide to delete the subscription, or the subscription may expire without any valid refresh. This situation is accomplished through the use of a SIP SUBSCRIBE (expiry=0) request at 160 from the Watcher 120 to the Presence Server 115. Upon deactivation of the subscription, the Watcher 120 is notified by the Presence Server 115 of the latest Presence Information. This occurs via a SIP NOTIFY (soft-state info) request at 165. In addition, the Presence Source 110 is also notified by the Presence Server 115 about the Watcher's leaving via a winfo notification at 170 using a SIP NOTIFY (winfo-Watcher gone) request. As there is no valid Watcher subscription for the Presentity at this point, the Presence Source 110 can discontinue the soft-state publication.

Figure 2:
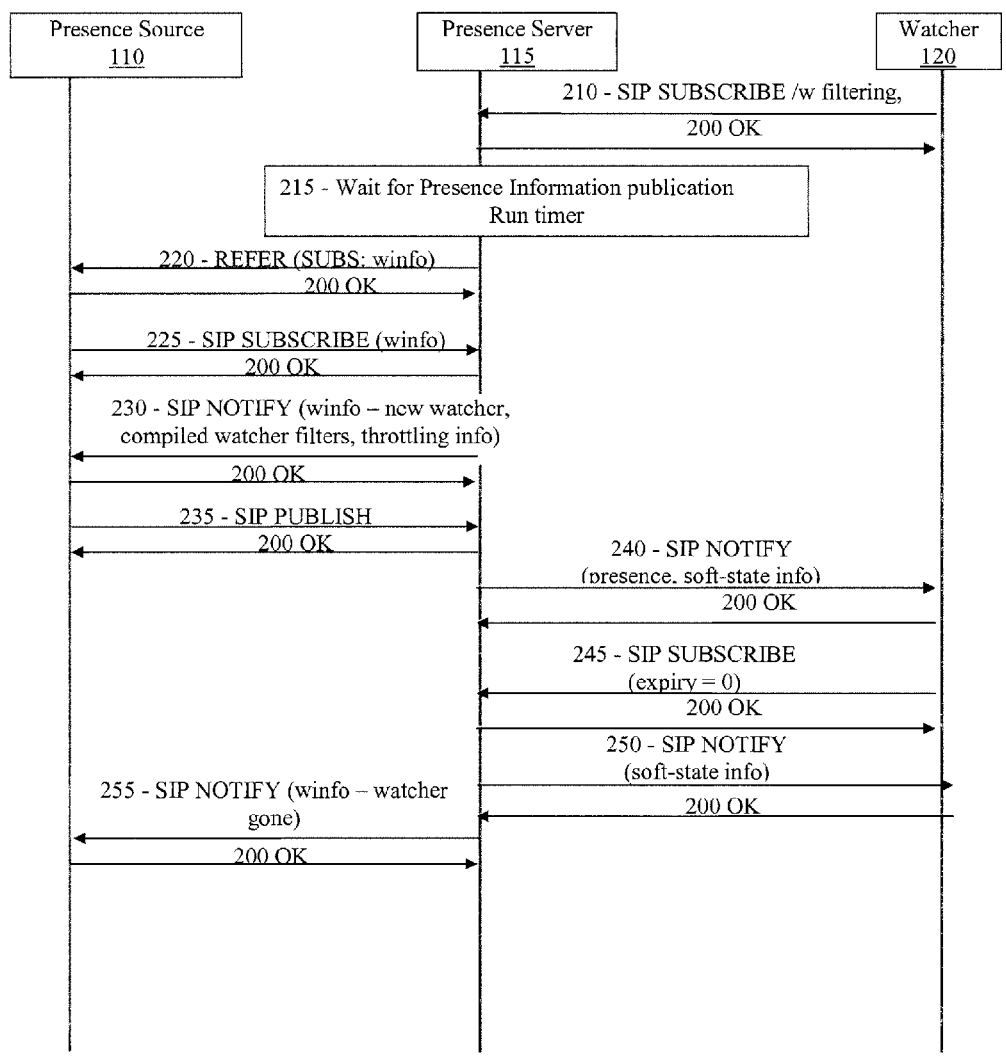
FIG. 2 is a flow chart showing the interaction among a Presence Source, a Presence Server, and a Watcher in the situation where the Presence Source is not subscribed to Watcher information when a new Watcher arrives.

FIG. 2 is a flow chart showing the interaction among the Presence Source 110, the Presence Server 115, and the Watcher 120 in a situation where the Presence Source 100 is not subscribed to Watcher information when the new Watcher 120 arrives. At 210 in FIG. 2, the Watcher 120 subscribes for the Presence Information of the Presentity using a SIP SUBSCRIBE request. The subscription request contains a demand for specific Presence Information (event notification filtering) and also a throttle parameter. Lacking available Presence Information, the Presence Server 115 delays answering the Watcher's subscription request with a notification and starts a timer defining the time period in which the Presence Server 115 expects to receive Presence Information from the Presence Source 110. This is represented at 215.

At 220, the Presence Server 115 uses a SIP REFER request to inform the Presence Source 110 about the need of Presence Information. The SIP REFER request includes a Refer-To header field set to the Presentity URI. The Refer-To header field includes a "method" parameter set to the value "SUBSCRIBE?Event=presence.winfo". This instructs the Presence Source 110 to subscribe to the presence.winfo event package. The SIP REFER request also includes a Refer-Sub header field set to "false" according to the procedures described in IETF RFC4488 in order to avoid the implicit subscription caused by the REFER method. In response and at 225, the Presence Source 100 subscribes to Watcher information by sending a SIP SUBSCRIBE (winfo) request to the Presence Server 115. At 230, the Presence Server 115 sends a winfo notification to the Presence Source using a SIP NOTIFY request. This notification indicates that the Presence of the Watcher 120 watching for Presence Information. The winfo notification also includes the filtering and throttling information previously received from the Watcher 120. At 235, the Presence Source 110 makes a soft-state publication using a SIP PUBLISH request, with the information being provided to the Presence Server 115. If there was a request from the Watcher 120 for specific Presence Information, then the source publishes only those attributes. If there was a request from the Watcher 120 to throttle the notifications, the source publishes the Presence Information only within the particular throttle interval. At 240, the soft-state Presence Information is then provided from the Presence Server 115 to the Watcher 120 using a SIP NOTIFY request.

At some later time, the Watcher 120 may decide to delete the subscription, or the subscription may expire without any valid refresh. This situation is accomplished through the use of a SIP SUBSCRIBE (expiry=0) request at 245 from the Watcher 120 to the Presence Server 115. Upon deactivation of the subscription, the Watcher 120 is notified by the Presence Server 115 of the latest Presence Information. This occurs via a SIP NOTIFY (soft-state info) request at 250. In addition, the Presence Source 110 is also notified by the Presence Server 115 about the Watcher's leaving via a winfo notification at 255 using a SIP NOTIFY (winfo-Watcher gone) request. As there is no valid Watcher subscription for the Presentity at this point, the Presence Source 110 can discontinue the soft-state publication.

In order to include event notification filtering information in Watcherinfo notifications, the body of the winfo notification can include a multipart/related content. One part of this content comprises the application/Watcherinfo+xml content defined in IETF RFC 3858, which can be found at www.ietf.org/rfc/rfc3858.txt. The other portion of the content comprises the application/simple-filter+xml content defined in IETF RFC 4661.

In order to include Watcher-specified or Presence Server-configured throttling information in Watcherinfo notifications, the RFC 3858 defined XML document is extended with an XML element referred to herein as <throttle>. The <throttle> element can appear as a child element of the <Watcher-list> element. The <throttle> element includes either the negotiated throttle parameter as defined in draft-niemi-sipping-event-throttle-05 or the Presence Server configured throttling configuration setting.

The XML schema for the <throttle> element in one embodiment is defined as follows:

```
<?xml version="1.0" encoding="UTF-8"?>
<xs:schema
    targetNamespace="urn:oma:xml:prs:pidf:oma-winfo"
    xmlns="urn:oma:xml:prs:pidf:oma-winfo"
    xmlns:xs=http://www.w3.org/2001/XMLSchema
    elementFormDefault="qualified"
    attributeFormDefault="unqualified">
  <xs:element name="throttle" type="xs:positiveInteger"/>
</xs:schema>
```

In the event of multiple Watchers, the Presence Server can combine event notification filtering and throttling information from multiple Watchers before giving this information to the Presence Source. This is needed since the Presence Source is not interested in Watcher-specific attributes. Instead, the Presence Source's interest is limited to knowing largest set of Presence information it needs to publish information.

The following example illustrates Watcher information package extensions according to various embodiments. In this example, Watcher1 subscribes with the following properties. There is a filter document in which it is only interested in receiving the tuple describing the Open Mobile Alliance (OMA) PoC service. The filter document is constructed according to IETF RFC 4661. Second, there is also a throttle parameter requesting that the Presence Server not send consecutive notifications more frequently than every 5 seconds. The throttle parameter is identified according to draft-niemi-sipping-event-throttle-05.

The example subscription request is as follows:

```
SUBSCRIBE sip:presentity@home2.net SIP/2.0
Via: SIP/2.0/UDP [5555::aaa:bbb:ccc:ddd]:1357;comp=sigcomp;branch=z9hG4bKnashds7
Max-Forwards: 70
P-Access-Network-Info: 3GPP-UTRAN-TDD; utran-cell-id-3gpp=234151D0FCE11
Route: <sip:pcscf1.visited1.net:7531;lr;comp=sigcomp>, <sip:orig@scscf1.home1.net;lr>
P-Preferred-Identity: <sip:user1_public1@home1.net>
Privacy: none
From: <sip:user1_public1@home1.net>;tag=31415
To: <sip:presentity@home2.net>
Call-ID: b89rjhnedlrfjflslj40a222
CSeq: 61 SUBSCRIBE
Require: sec-agree
Proxy-Require: sec-agree
Security-Verify: ipsec-3gpp; q=0.1; alg=hmac-sha-1-96; spi-c=98765432; spi-s=87654321; port-
        c=8642; port-s=7531
Event: presence ; throttle=5
```

```
Expires: 7200
Accept: application/pidf+xml;q=0.3, application/pidf-diff+xml;q=1
Contact: <sip:[5555::aaa:bbb:ccc:ddd]:1357;comp=sigcomp>
Content-Type: application/simple-filter+xml
Content-Length: xxx
    <?xml version="1.0" encoding="UTF-8"?>
    <filter-set xmlns="urn:ietf:params:xml:ns:simple-filter">
        <ns-bindings>
            <ns-binding prefix="pidf" urn="urn:ietf:params:xml:ns:pidf"/>
            <ns-binding prefix="op" urn="urn:oma:xml:prs:pidf:oma-pres"/>
        </ns-bindings>
        <filter id="123" uri="sip:presentity@home2.net">
            <what>
                <include type="xpath">
                    /pidf:Presence/pidf:tuple[op:service-description/op:service-
                    id="org.openmobilealliance:PoC-session"]
                </include>
            </what>
        </filter>
    </filter-set>
```

Additionally, Watcher2 subscribes with the following properties. There is a filter document for which it is only interested in receiving the tuple describing the OMA Instant Messaging (IM) service. The filter document is identified in accordance with IETF RFC 4661. Second, there is a throttle parameter requesting that the Presence Server not send consecutive notifications more quickly than every ten seconds. The throttle parameter is according to draft-niemi-sipping-event-throttle-05. The example subscription request is as follows:

```
SUBSCRIBE sip:presentity@home2.net SIP/2.0
Via: SIP/2.0/UDP
        [5555::aaa:bbb:ccc:ddd]:1357;comp=sigcomp;branch=z9hG4bKnashds7
Max-Forwards: 70
P-Access-Network-Info: 3GPP-UTRAN-TDD; utran-cell-id-3gpp=234151D0FCE11
Route: <sip:pcscf1.visited1.net:7531;lr;comp=sigcomp>, <sip:orig@scscf1.home1.net;lr>
P-Preferred-Identity: <sip:user1_public1@home1.net>
Privacy: none
From: <sip:user2_public1@home1.net>;tag=31415
To: <sip:presentity@home2.net>
Call-ID: b89rjhnedlrfjflslj40a222
CSeq: 61 SUBSCRIBE
Require: sec-agree
Proxy-Require: sec-agree
Security-Verify: ipsec-3gpp; q=0.1; alg=hmac-sha-1-96; spi-c=98765432; spi-
        s=87654321; port-c=8642; port-s=7531
Event: presence; throttle=10
Expires: 7200
Accept: application/pidf+xml;q=0.3, application/pidf-diff+xml;q=1
Contact: <sip:[6666::aaa:bbb:ccc:ddd]:1357;comp=sigcomp>
Content-Type: application/simple-filter+xml
Content-Length: xxx
    <?xml version="1.0" encoding="UTF-8"?>
    <filter-set xmlns="urn:ietf:params:xml:ns:simple-filter">
        <ns-bindings>
            <ns-binding prefix="pidf" urn="urn:ietf:params:xml:ns:pidf"/>
            <ns-binding prefix="op" urn="urn:oma:xml:prs:pidf:oma-pres"/>
        </ns-bindings>
        <filter id="123" uri="sip:presentity@home2.net">
            <what>
                <include type="xpath">
                    /pidf:Presence/pidf:tuple[op:service-description/op:service-
                    id="org.openmobilealliance:IM"]
                </include>
            </what>
        </filter>
    </filter-set>
```

The Presence Server combines the above filtering documents and chooses the lowest throttling parameter when sending the Watcher information notification:

```
NOTIFY sip:[7777::aaa:bbb:ccc:ddd]:1357;comp=sigcomp SIP/2.0
Via: SIP/2.0/UDP ps.home1.net;branch=z9hG4bK240f34.1
Max-Forwards: 70
```

-continued

```
P-Charging-Vector: icid-value="AyretyU0dm+6O2IrT5tAFrbHLso=323551024"; orig-
ioi=home1.net
P-Charging-Function-Addresses: ccf=[5555::b99:c88:d77:e66];
ccf=[5555::a55:b44:c33:d22]; ecf=[5555::1ff:2ee:3dd:4ee]; ecf=[5555::6aa:7bb:8cc:9dd]
Route: <sip:scscfl.home2.net;lr>, <sip:pcscfl.visited2.net;lr>
From: <sip:presentity@home2.net>;tag=151170
To: <sip:presentity@home2.net>;tag=31415
Call-ID: b89rjhnedlrfjflslj40a222
CSeq: 90 NOTIFY
Subscription-State: active;expires=5000
Event: Presence.winfo
Contact: <sip:ps.home1.net;lr>
Content-Type: multipart/related; boundary=boundary42
--boundary42
Content-Type: application/Watcherinfo+xml
<?xmlversion="1.0"?>
    <Watcherinfo xmlns="urn:ietf:params:xml:ns:Watcherinfo"
                    version="0" state="full">
        <Watcher-list resource="sip:presentity@home2.net" package="Presence">
            <Watcher id="34bytzx54" event="subscribe" duration-subscribed="1"
                    status="active">sip:user1 _public1@home1.net</Watcher>
            <Watcher id="34ddsje54" event="subscribe" duration-subscribed="1"
                    status="active">sip:user2_public1@home1.net</Watcher>
                    <throttle>5</throttle>
        </Watcher-list>
    </Watcherinfo>
--boundary42
Content-Type: application/simple-filter+xml
Content-Length: xxx
    <?xml version="1.0" encoding="UTF-8"?>
    <filter-set xmlns="urn:ietf:params:xml:ns:simple-filter">
        <ns-bindings>
            <ns-binding prefix="pidf" urn="urn:ietf:params:xml:ns:pidf"/>
            <ns-binding prefix="op" urn="urn:oma:xml:prs:pidf:oma-pres"/>
        </ns-bindings>
        <filter id="123" uri="sip:presentity@home2.net">
            <what>
                <include type="xpath">
                    /pidf:Presence/pidf:tuple[op:service-description/op:service-
id="org.openmobilealliance:IM" or op: service-description/op:service-
id="org.openmobilealliance:PoC-session]
                </include>
            </what>
        </filter>
    </filter-set>
--boundary42—
```

When the Presence Source receives the Watcher information notification depicted above, it will observe that there are two active Watchers which are only interested in receiving the tuple describing the OMA IM service and the tuple describing the OMA Push to Talk Over Cellular (PoC) service, and their chosen throttling interval is five seconds. Consequently, the Presence Source will publish this information if it is aware, but not more frequently than every five seconds. If the Presence Source is not responsible for publishing the requested information, then it won't start publishing it.

Communication devices of the various embodiments discussed herein may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device may communicate using various media including, but not limited to, radio, infrared, laser, cable connection, and the like.

Figure 3:
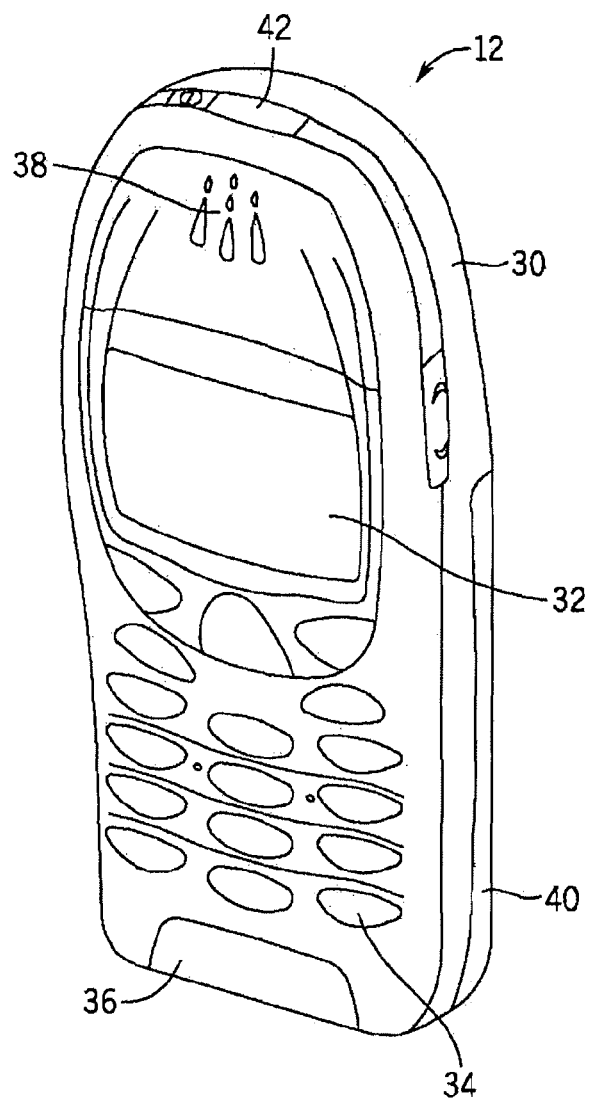
FIG. 3 is a perspective view of an electronic device that can be used in conjunction with the implementation of various embodiments of the present invention.
Figure 4:
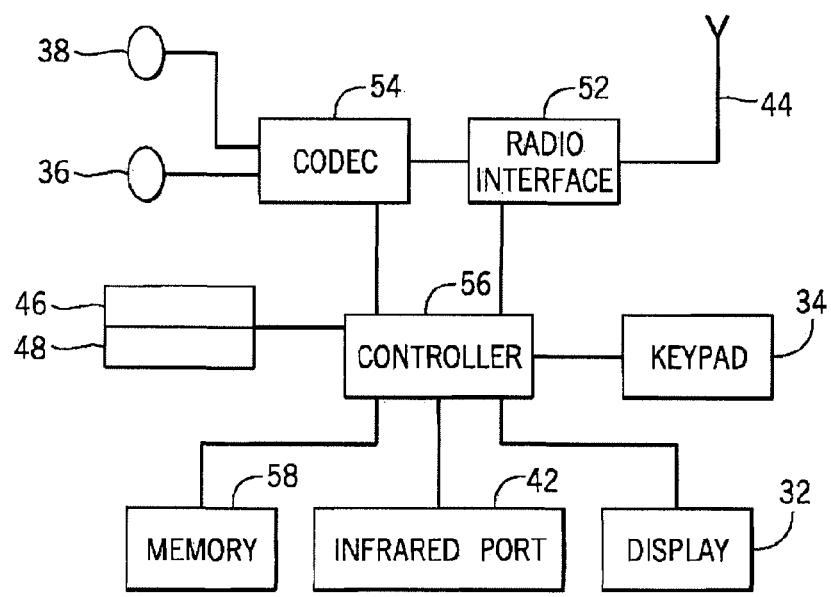
FIG. 4 is a schematic representation of the circuitry which may be included in the electronic device of FIG. 3.

FIGS. 3 and 4 show one representative mobile device 12 within which the present invention may be implemented. It should be understood, however, that the present invention is not intended to be limited to one particular type of electronic device. The mobile device 12 of FIGS. 3 and 4 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56 and a memory 58. Individual circuits and elements are all of a type well known in the art, for example in the Nokia range of mobile telephones.

Various embodiments described herein is described in the general context of method steps or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Embodiments of the present invention may be implemented in software, hardware, application logic or a combination of software, hardware and application logic. The software, application logic and/or hardware may reside, for example, on a chipset, a mobile device, a desktop, a laptop or a server. Software and web implementations of various embodiments of the present invention can be accomplished with standard programming techniques with rule-based logic and other logic to accomplish various database searching steps or processes, correlation steps or processes, comparison steps or processes and decision steps or processes. It should be noted that the words "component" and "module," as used herein and in the following claims, is intended to encompass implementations using one or more lines of software code, and/or hardware implementations, and/or equipment for receiving manual inputs.

The foregoing description of embodiments of the present invention have been presented for purposes of illustration and description. The foregoing description is not intended to be exhaustive or to limit embodiments of the present invention to the precise form disclosed, and modifications and variations are possible in light of the above teachings or may be acquired from practice of various embodiments of the present invention. The embodiments discussed herein were chosen and described in order to explain the principles and the nature of various embodiments of the present invention and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A method, comprising:
   receiving a subscription request from a Watcher for a one-time fetch of specific Presence Information;
   notifying a Presence Source that the Watcher wants to watch for the specific Presence Information;
   in response to the sent notification, receiving the specific Presence Information from the Presence Source via a soft-state publication,
      wherein the soft-state publication is at least based in part on the subscription request and the soft-state publication only publishes attributes of a demand of the subscription request,
      wherein the information included in the specific Presence Information and a frequency of the soft-state publication are determined based on the subscription request,
      wherein the information included in the specific Presence Information includes a status indicator that indicates at least one of an authorization or a subscription of a communication partner to communicate; and
   providing the Watcher with the specific Presence Information.

2. The method of claim 1, further comprising, in response to the received subscription request for a one-time fetch,
   starting a timer, the timer defining a time in which the Presence Source is expected to publish the specific Presence Information; and
   if the specific Presence Information is not received by the end of the time defined by the timer, providing the Watcher with a currently available Presence document or, if no Presence Information is available, an empty Presence document.

3. The method of claim 1,
   wherein, if at least one additional Watcher is watching for specific Presence Information, then the specific Presence Information requested by each Watcher is aggregated into a single document containing all of the Presence Information requested by each Watcher and is provided to the Presence Source.

4. The method of claim 1, further comprising, if the Presence Source has not previously subscribed to Information about Watchers:
   after receiving the subscription request, informing the Presence Source about a need to subscribe for Watcher Information; and
   in response to the informing of the Presence Source, receiving a Watcher Information subscription request from the Presence Source.

5. The method of claim 1, further comprising:
   providing the Presence Source with a Session Initiation Protocol (SIP) refer request; and
   in response to the SIP refer request, receiving a Watcher Information subscription request from the Presence Source,
   wherein the Watcher Information subscription request is received prior to the soft-state publication of the specific Presence Information.

6. The method of claim 1, further comprising, in response to the received subscription request for a one-time fetch and a lack of available Presence Information,
   delaying an answer to the subscription request;
   starting a timer, the timer defining a time in which the Presence Source is expected to publish the Presence Information.

7. A computer program product, embodied in a non-transitory computer-readable storage medium, comprising computer code configured to perform a method, the method comprising:
   receiving a subscription request from a Watcher for a one-time fetch of specific Presence Information;
   notifying a Presence Source that the Watcher wants to watch for the specific Presence Information;
   in response to the sent notification, receiving the specific Presence Information from the Presence Source via a soft-state publication,
      wherein the soft-state publication is at least based in part on the subscription request and the soft-state publication only publishes attributes of a demand of the subscription request,
      wherein the information included in the specific Presence Information and a frequency of the soft-state publication are determined based on the subscription request,
      wherein the information included in the specific Presence Information includes a status indicator that indicates at least one of an authorization or a subscription of a communication partner to communicate; and
   providing the Watcher with the specific Presence Information.

8. An apparatus, comprising:
   an electronic device configured to:
   receive a subscription request from a Watcher for a one-time fetch of specific Presence Information;

notify a Presence Source that the Watcher wants to watch for the specific Presence Information;
in response to the sent notification, receive the specific Presence Information from the Presence Source via a soft-state publication,
wherein the soft-state publication is at least based in part on the subscription request and the soft-state publication only publishes attributes of a demand of the subscription request,
wherein the information included in the specific Presence Information and a frequency of the soft-state publication are determined based on the subscription request,
wherein the information included in the specific Presence Information includes a status indicator that indicates at least one of an authorization or a subscription of a communication partner to communicate; and
provide the Watcher with the specific Presence Information.

9. The apparatus of claim 8, wherein the electronic device is further configured to, in response to the received subscription request for a one-time fetch,
start a timer, the timer defining a time in which the Presence Source is expected to publish the specific Presence Information; and
if the specific Presence Information is not received by the end of the time defined by the timer, provide the Watcher with a currently available Presence document or, if no Presence Information is available, an empty Presence document.

10. The apparatus of claim 8, wherein the demand is for the specific Presence Information and a throttle parameter,
wherein, if at least one additional Watcher is watching for specific Presence Information, then the specific Presence Information requested by each Watcher is aggregated into a single document containing all of the Presence Information requested by each Watcher and is provided to the Presence Source.

11. The apparatus of claim 10, wherein the notification includes the demand for the specific Presence Information and the throttle parameter.

12. The apparatus of claim 8, wherein the electronic device is further configured to, if the Presence Source has not previously subscribed to Information about Watchers:
after receiving the subscription request, inform the Presence Source about a need to subscribe for Watcher Information; and
in response to the informing of the Presence Source, receive a Watcher Information subscription request from the Presence Source.

13. A method, comprising:
receiving a notification from a Presence Server that a Watcher wants to watch for specific Presence Information; and
in response to the notification, performing a publication of the specific Presence Information for reception by the Presence Server and transmission therefrom to the Watcher,
wherein the publication only publishes attributes included in the notification,
wherein the information included in the specific Presence Information and a frequency of the publication are determined based on a subscription request associated with the notification,
wherein the information included in the specific Presence Information includes a status indicator that indicates at least one of an authorization or a subscription of a communication partner to communicate.

14. The method of claim 13, further comprising:
receiving a deactivation notification from the Presence Server that a subscription has been deactivated by the Watcher; and
discontinuing the publication of the specific Presence Information.

15. The method of claim 13, wherein the attributes are of a demand included in a subscription request of the Watcher for the specific Presence Information.

16. The method of claim 13, further comprising, if not previously subscribed to Information about the Watcher:
receiving information from the Presence Server about a need for subscribing for Watcher Information; and
in response to the received information, providing a Watcher Information subscription request to the Presence Server.

17. A computer program product, embodied in a non-transitory computer-readable medium, comprising computer code configured to perform a method, the method comprising:
receiving a notification from a Presence Server that a Watcher wants to watch for specific Presence Information; and
in response to the notification, performing a publication of the specific Presence Information for reception by the Presence Server and transmission therefrom to the Watcher,
wherein the publication only publishes attributes included in the notification,
wherein the information included in the specific Presence Information and a frequency of the publication are determined based on a subscription request associated with the notification,
wherein the information included in the specific Presence Information includes a status indicator that indicates at least one of an authorization or a subscription of a communication partner to communicate.

18. An apparatus, comprising:
an electronic device configured to:
process a received notification from a Presence Server that a Watcher wants to watch for the specific Presence Information; and
in response to the notification, perform a publication of the specific Presence Information for reception by the Presence Server and transmission therefrom to the Watcher,
wherein the publication only publishes attributes included in the notification,
wherein the information included in the specific Presence Information and a frequency of the publication are determined based on a subscription request associated with the notification,
wherein the information included in the specific Presence Information includes a status indicator that indicates at least one of an authorization or a subscription of a communication partner to communicate.

19. The apparatus of claim 18, wherein the electronic device is further configured to:
process a received deactivation notification from the Presence Server that a subscription has been deactivated by the Watcher; and
discontinue the publication of the specific Presence Information.

20. The apparatus of claim 18, wherein the electronic device is further configured to, if not previously subscribed to Information about the Watcher:

process received information from the Presence Server about a need for subscribing for Watcher Information; and in response to the received information, provide a Watcher Information subscription request to the Presence Server.

21. A system, comprising:

at least one processor coupled to a memory;

a Presence Source; and a Presence Server configured to:

receive a subscription request from a Watcher for specific Presence Information, and notify the Presence Source that the Watcher wants to watch for the specific Presence Information, wherein the Presence Source is configured to, in response to the notification from the Presence Server, perform a publication of the specific Presence Information for reception by the Presence Server and transmission therefrom to the Watcher, wherein the publication only publishes attributes of a demand included in the subscription request, wherein the information included in the specific Presence Information and a frequency of the publication are determined based on the subscription request, wherein the information included in the specific Presence Information includes a status indicator that indicates at least one of an authorization or a subscription of a communication partner to communicate.

22. The system of claim 21, wherein the Presence Server is configured to provide to the Presence Source a notification that the subscription has been deactivated by the Watcher, wherein the Presence Source is configured to, in response to the notification that the subscription has been deactivated, discontinue the publication of the specific Presence Information.

23. The system of claim 21, wherein, if at least one other Watcher is watching for Presence Information, then the specific Presence Information requested by each Watcher is aggregated into a single document containing all of the Presence Information requested by each Watcher and is provided to the Presence Source.

\* \* \* \* \*